(12) United States Patent
Tanaka et al.

(10) Patent No.: US 6,952,067 B2
(45) Date of Patent: Oct. 4, 2005

(54) ROTARY ELECTRIC MACHINE AND A METHOD OF PRODUCING THE SAME

(75) Inventors: Toshinori Tanaka, Tokyo (JP); Hisato Sakaguchi, Tokyo (JP); Kyouhei Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 361 days.

(21) Appl. No.: 10/091,455

(22) Filed: Mar. 7, 2002

(65) Prior Publication Data

US 2003/0080647 A1 May 1, 2003

(30) Foreign Application Priority Data

Oct. 29, 2001 (JP) ......................................... 2001-330386

(51) Int. Cl.[7] ........................ H02K 13/00; H02K 15/02; H01R 39/04
(52) U.S. Cl. ........................ 310/248; 310/233; 451/418
(58) Field of Search ................. 310/233, 248; 451/418; 29/27 B

(56) References Cited

U.S. PATENT DOCUMENTS 3,722,144 A * 3/1973 Rickrode et al. .............. 451/49
3,849,946 A * 11/1974 Ogura ......................... 451/418
3,932,205 A * 1/1976 Lindholm et al. ............ 148/567
4,525,957 A * 7/1985 Daniels ........................ 451/63
5,065,651 A * 11/1991 Amey ........................ 82/1.11
5,177,842 A * 1/1993 Hongo ......................... 29/27 B
5,454,284 A * 10/1995 Sbalchiero et al. ........... 82/1.11

FOREIGN PATENT DOCUMENTS

| JP | 53-86410 | 7/1978 |
| JP | 57-113754 | 7/1982 |
| JP | 59-90275 | 6/1984 |
| JP | 10-271768 | 10/1998 |
| JP | 2000-4562 | 1/2000 |
| JP | 2001-8415 | 1/2001 |

OTHER PUBLICATIONS

Japanese Office Action for JP 2001-330386 mailed Sep. 2, 2003 along with English translation.

* cited by examiner

Primary Examiner—Burton Mullins
(74) Attorney, Agent, or Firm—Sughrue Mion, PLLC

(57) ABSTRACT

A surface of a commutator 5 is rubbed by a shakedown brush 21 other than ordinary brushes 11 to produce a carbon coat, whereby a shakedown process can be reduced or abolished.

11 Claims, 1 Drawing Sheet

\# ROTARY ELECTRIC MACHINE AND A METHOD OF PRODUCING THE SAME

BACKGROUND OF THE INVENTION

1. Field of the Invention

The present invention relates to a rotary electric machine, in which a surface of commutator is rubbed by a shakedown brush in advance, and a method of producing the rotary electric machine, in particular to a rotary electric machine suitable for an electromotive power steering motor, and a method of producing the rotary electric machine.

2. Discussion of Background

FIG. 2 is a cross-sectional view of a part of conventional rotary electric machine for showing a structure and sliding traces of brush of the conventional rotary electric machine. In FIG. 2, numerical reference 1 designates a yoke of the rotary electric machine; numerical reference 2 designates four magnets located on an inner peripheral surface of the yoke 1 at even intervals; numerical reference 3 designates an armature of the rotary electric machine having a shaft 4 and a commutator 5, wherein a predetermined gap is provided between the inner peripheral surface of magnets 2; and numerical reference 6 designates a bracket covering an opening end of the yoke 1, wherein the shaft 4 is supported by a bearing 7 located in the yoke 1 and a bearing 8 located in the bracket 6 so as to be rotatable.

Numerical reference 9 designates an attachment of brush holder, located in the bracket 6; and numerical reference 10 designates a brush holder located in the attachment 9 of brush holder having, for example, four holding portions in a circumferential direction, and holding brushes 11 and springs 12 inside thereof. For example, the number of the brushes 11 is four, each of the brushes rubs against the surface of the commutator 5. The number of the springs 12 is four, and the springs apply a predetermined pressure force respectively between the brushes 11 and the commutator 5. The brushes 11 are different from a shakedown brush, to be described below, and ordinarily assembled in this kind of rotary electric machines.

Numerical reference 13 designates sliding traces produced by the rubbing motions of the brushes 11 against the surface of the commutator 5, wherein the sliding traces are schematically shown to indicate an area of the sliding traces. Because the brushes 11 are shaped as in FIG. 2, two sliding traces 13 are produced. As the brushes 11 wear out, the two sliding traces are gradually widened, and finally the entire sliding surfaces of the brushes rub against the commutator. The brushes 11 are shaped so that the both ends rub against the commutator 5 in order to progress aging between the brushes and the commutator 5 as early as possible in a primary stage after completing to assemble the rotary electric machine, whereby noise is early reduced. This shape of the brushes 11 is adopted in conventional techniques.

In the rotary electric machine constructed as described above, when the armature 3 rotates, the commutator 5, fixed by pressing into the shaft 4, rotates in the same direction at the same rotational speed as that of the armature 3. When the commutator 5 rotates, the brushes 11 slide on the surface of the commutator 5 and are pressed and in contact with the commutator 5 by the springs 12. In particular, immediately after completing to assemble the rotary electric machine, a sliding condition between the surface of the commutator 5 and the brushes 11 is not stabilized. Therefore, in order to reduce noise caused along with the sliding motion by the brushes 11 and stabilize the performance of the rotary electric machine, a relatively small current is applied to the rotary electric machine after completing to assemble the rotary electric machine, and the armature 3 is rotated to stabilize the sliding motion between the brushes 11 and the surface of the commutator 5. This is generally called "shakedown", wherein because the shakedown process requires a substantial time, a drop of productivity and a cost increment are caused.

Further, because a carbon coat is not produced on the surface of the commutator 5 immediately after completing to assemble the rotational electric machine, a relatively large current applied to the rotary electric machine for measuring the performance is apt to generate spark. Therefore, the spark roughens the surface of the commutator 5, whereby noise is caused and lifetimes of the commutator and the brushes are shortened. To deal therewith, it is necessary to measure the performance after the shakedown process, whereby the drop of productivity and the cost increment are caused.

Further, when the rotary electric machine is applied in particular to a motor for an electromotive power steering device, because manipulation of a steering handle variously changes in accordance with driving conditions, a rotational speed and a rotational direction of the motor, interlocked with the steering handle, variously change, and noise easily bothers a driver. Further, along with a tendency of designing silent cars, it is required to obtain strict silence of the motor for electromotive power steering devices. Therefore, the shakedown process is performed for a relatively long time, whereby the drop of productivity and the cost increment are extensively caused in particular in mass-produced rotary electric machines.

SUMMARY OF THE INVENTION

It is an object of the present invention to solve the above-mentioned problems inherent in the conventional technique and to provide a low noise rotary electric machine of a good performance at a low cost.

According to a first aspect of the present invention, there is provided a rotary electric machine comprising a commutator; brushes sliding on a surface of the commutator; and an armature, wherein the surface of the commutator is rubbed by a shakedown brush other than the brushes in advance.

According to a second aspect of the present invention, there is provided the rotary electric machine according to the preceding aspect of the invention, wherein a carbon coat is produced on the surface of the commutator by rubbing the surface with the shakedown brush.

According to a third aspect of the present invention, there is provided the rotary electric machine according to the preceding aspects of the invention, wherein a sliding width by the shakedown brush is larger than a primary sliding width by the brushes.

According to a fourth aspect of the present invention, there is provided the rotary electric machine according to the preceding aspects of the invention, wherein a material of the shakedown brush is different from that of the brushes.

According to a fifth aspect of the present invention, there is provided the rotary electric machine according to the preceding aspects of the invention, wherein the rotary electric machine is applied to a motor for electromotive power steering device.

According to a sixth aspect of the present invention, there is provided a method of manufacturing a rotary electric machine including a commutator, an armature having the commutator, and brushes sliding on a surface of the commutator comprising a step of rubbing the surface of the commutator by a shakedown brush other than the brushes in advance.

According to a seventh aspect of the present invention, there is provided a method of manufacturing a rotary electric machine including a commutator, an armature having the commutator, and brushes sliding on a surface of the commutator comprising a step of rubbing the surface of the commutator by a shakedown brush other than the brushes in advance before the brushes are assembled in the rotary electric machine.

According to an eighth aspect of the present invention, there is provided a method of manufacturing a rotary electric machine including a commutator, an armature having the commutator, and brushes sliding on a surface of the commutator comprising a step of rubbing the surface of the commutator by a shakedown brush other than the brushes in advance when the armature stands as a single unit before assembling into the rotary electric machine.

According to a ninth aspect of the present invention, there is provided a method of manufacturing a rotary electric machine including a commutator, an armature having the commutator, and brushes sliding on a surface of the commutator comprising a step of rubbing the surface of the commutator by a shakedown brush other than the brushes in advance without applying electricity to the shakedown brush.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 and 2 as follows, wherein the same numerical references are used for the same or similar portions and description of these portions is omitted.

Embodiment 1

Figure 1:
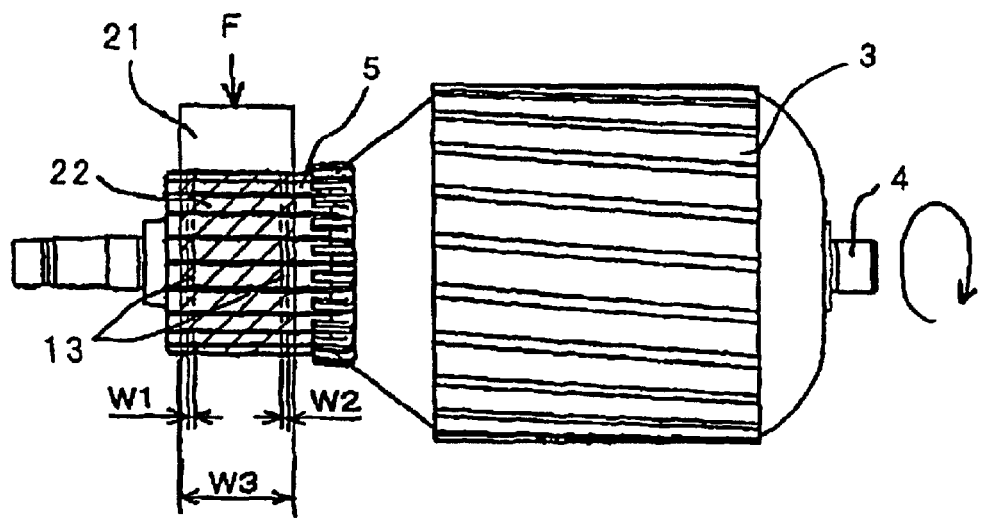
FIG. 1 shows a shakedown brush and explains an aging process according to Embodiment 1 of the present invention.
Figure 2:
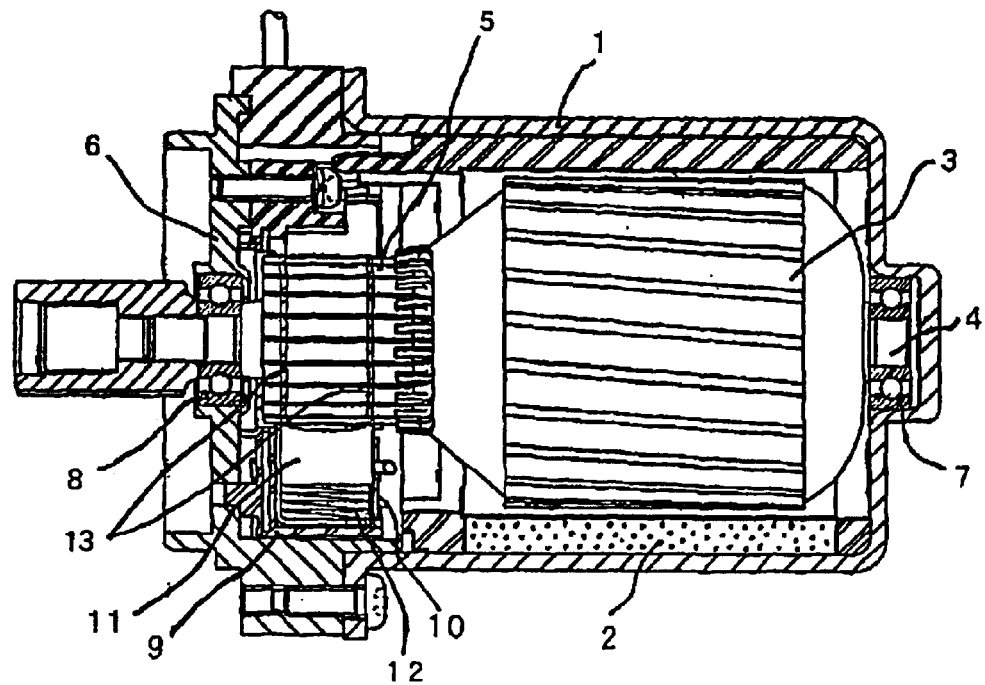
FIG. 2 is a cross-sectional view of a part of the structure of the conventional rotary electric machine wherein the sliding traces with the brushes are marked.

FIG. 1 shows a shakedown brush in a rotary electric machine and explains an aging process according to Embodiment 1, wherein the same numerical references are used for portions the same as or similar to those in the conventional technique. In FIG. 1, numerical reference 21 designates a shakedown brush, wherein the number of the shakedown brush is one, and loads of carbon and copper of the shakedown brush are different from those of the brushes 11 to set hardness of the shakedown brush low. Numerical reference 22 designates a sliding trace with the shakedown brush 21, and the numerical reference W3 designates the width of the sliding trace. A shape of the shakedown brush 21 is different from those of the brushes 11, wherein the width of the shakedown brush 21 is completely in contact with and slides on the commutator as shown in FIG. 1. The sliding trace 13 shown in FIG. 1 is marked for the purpose of comparing with a pair of sliding traces 13 with the brushes illustrated in FIG. 2, and the widths of the sliding traces 13 are respectively designated by W1 and W2. The widths W1 and W2 of the sliding traces 13 are positioned inside the width W3 of the sliding trace 22, wherein an area of the sliding trace 22 on the commutator 5 is more ample than those of the sliding traces 13.

According to Embodiment 1, a shaft 4 is press-fitted into an armature iron core and a commutator 5, an armature coil is provided in the armature iron core, and hooks of the commutator 5 are connected to the armature coil by fusing or the equivalent methods. Thereafter, the shaft 4 is rotated to machine the surface of the commutator 5 by a turning tool in a lathe for finishing. Succeedingly, the shakedown brush 21 is pressed on the surface of the commutator 5 in a direction of F in FIG. 1, and the armature 3 is rotated without applying electricity so that the shakedown brush 21 slides on the surface of the commutator 5. Thereafter, the shakedown brush 21 is removed, and a bearing 7 is press-fitted into the shaft 4. On the other hand, a bearing 8 is press-fitted into a bracket 6, and an attachment of brush holder 9 is attached to the bracket 6 by screw cramp. In the attachment 9, four brushes 11 are provided along with springs 12 at even intervals of 90° on its circumference. The armature 3 is inserted in the attachment 9 so that the commutator 5 of the armature 3 is positioned on an inner peripheral side of the attachment 9. Further, magnets 2 corresponding to four poles are located on an inner periphery of a yoke 1, the yoke 1 is engaged with the bracket 6 so as to accommodate the armature 3, and the yoke 1 and the bracket 6 are integrally fixed by screw cramp.

As described, according to Embodiment 1, the shakedown brush 21 other than the brushes 11 is used to rub the surface of the commutator 5 in advance. Therefore, it is possible to shakedown the surface of the commutator 5 in advance, a burr on the surface of the commutator 5 or the like can be removed, a sliding motion of the brushes 11 can be stabilized, noise of the rotary electric machine can be reduced in early stages, and the performance can be stabilized, whereby it becomes possible to reduce or abolish the aging process, productivity can be improved, and the cost of the rotary electric machine can be lowered.

Further, since the surface of the commutator 5 is rubbed by the shakedown brush 21 other than the brushes 11, the carbon coat is produced on the surface of the commutator 5 in advance, and generation of spark is restricted to prevent the surface of the commutator 5 from roughening, whereby noise of the rotary electric machine can be reduced in early stages, and the performance can be stabilized, whereby it is possible to reduce or abolish the aging process, the productivity can be improved, and the cost of the rotary electric machine can be lowered.

Further, since the width W3 of the sliding trace 22 of the shakedown brush 21 is larger than the sliding widths W1 and W2 of the sliding traces 13 of the brushes 11, even though positions of the shakedown brush 21 and the brushes 11 are misaligned in some degree, the carbon coat is produced on the surface of the commutator 5 in advance, whereby it is possible to reduce or abolish the aging process, the productivity can be improved, and the cost of the rotary electric machine can be lowered.

Further, even though the brushes 11 wear by operation of the rotary electric machine or a play is generated in an axial direction of the armature 3 of the rotary electric machine, since the carbon coat is produced on the surface of the commutator 5 with the shakedown brush 21 in advance, and a burr on the surface of the commutator 5 or the like is removed, it is possible to reduce noise and performance variation.

Further, since the material of the shakedown brush is different from the material of the brushes 11, in other words, the hardness of the shakedown brush 21 is made low, the carbon coat is produced in a short time, whereby the productivity can be improved and cost of the rotary electric machine can be lowered.

Further, since the present invention is applied to motors for electromotive power steering device, particularly requiring low noise, the carbon coat is produced in advance, and a burr or the like is removed, it is possible to reduce or abolish the long aging process, required in the conventional technique, and a mass production of rotary electric machines at a low cost becomes possible.

Further, because the carbon coat is produced in advance, and a burr or the like is removed as described above, generation of spark can be reduced, and noise in a radio receiver and so on, equipped in a vehicle, scarcely occurs.

Further, since the step of rubbing the surface of the commutator 5 by the shakedown brush 21 other than the brushes 11 in advance is provided, the carbon coat is produced by the shakedown brush 21 in advance, and a burr or the like on the surface of the commutator 5 is removed in advance, noise of the rotary electric machine is reduced in early stages, and the performance is stabilized, whereby the aging process can be reduced or eliminated, the productivity can be improved, and the cost of the rotary electric machine can be lowered.

Further, since the step of rubbing the surface of the commutator 5 by the shakedown brush 21 other than the brushes 11 in advance is provided before the brushes 11 are assembled in the rotary electric machine, it becomes easy to reserve a space for a sliding motion of the shakedown brush 21 and improve workability, whereby the productivity can be improved, and the cost of the rotary electric machine can be lowered.

Further, since the step of rubbing the surface of the commutator 5 by the shakedown brush 21 other than the brushes 11 in advance is provided while the armature 3 stands as a single unit, the carbon coat is produced on the surface of the commutator 5, whereby burrs and scars on the surface of the commutator 5 are removed by the shakedown brush 21, noise of the rotary electric machine can be reduced in early stages, and the performance can be stabilized, whereby it is possible to reduce or abolish the aging process, the productivity can be improved, and the cost of the rotary electric machine can be lowered.

Further, the commutator 5 located in the armature 3 is machined for finishing the surface of the commutator 5 before assembling in the rotary electric machine. The machining is ordinarily done by a lathe by rotating the shaft 4 for machining the surface of the commutator 5 by a machining tool. By pressing the shakedown brush 21 on the surface of the commutator 5 so as to slide on the surface after the finish machining of the surface of the commutator 5, the carbon coat is produced on the surface of the commutator 5, and a burr on the brush sliding portion produced by the finish machining or the like is removed. Meanwhile, since the shakedown brush 21 is used after the lathe work, another step of changing clipping of the armature 3 is unnecessary, and the rotational speed of the armature 3 is adjusted by the rotational speed of the lathe, it is possible to produce the carbon coat in a short time by rotating the lathe at a high speed. Further, by changing a pressure load, it is possible to produce the carbon coat in a short time.

Further, since the step of rubbing the surface of commutator 5 in advance without applying electricity to the shakedown brush 21, the surface of the commutator 5 is not made rough by spark, noise of the rotary electric machine is reduced in early stages, and the aging process is reduced or eliminated, whereby the productivity can be improved and the cost of the rotary electric machine can be lowered. Further, the number of the shakedown brushes 21 and the positions of the shakedown brushes 21 are freely set.

Embodiment 2

Although, in FIG. 1, the example that the armature stands as the single unit has been described. However, the surface of the commutator 5 may be rubbed with the shakedown brush 21 other than the brushes 11 in advance after assembling the armature 3, the bracket 6, and the bearing 8, and rotating these by an external means. In this case, the carbon coat is produced by the shakedown brush 21 in advance, and a burr or the like on the surface of the commutator 5 is removed in advance, whereby noise of the rotary electric machine is reduced in early stages, and the performance is stabilized, whereby the aging process can be reduced or abolished, the productivity can be improved, and the cost of the rotary electric machine can be lowered.

Embodiment 3

In Embodiments 1 and 2, the number of shakedown brush 21 is one. However, the number may be two or more. In this case, the duration of the aging process can be efficiently reduced.

Needless to say that, in Embodiments 1, 2, and 3, the electric motor has been exemplified, effects similar thereto can be demonstrated in a generator.

The first advantage of the rotary electric machine according to the present invention is that the aging process can be reduced or oreliminated, the productivity can be improved, and the cost of the rotary electric machine can be lowered.

The second advantage of the rotary electric machine according to the present invention is that variations of noise and the performance can be reduced.

The third advantage of the rotary electric machine according to the present invention is that a motor for an electromotive power steering device having a stable performance and generating a low noise suitable for a mass production is obtainable at a low cost.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2001-330386 filed on Oct. 29, 2001 including specification, claims, drawings and summary are incorporated herein by reference in its entirety.

What is claimed is:

1. A rotary electric machine comprising:

a commutator;

brushes sliding on a surface of the commutator; and an armature, wherein said surface of the commutator is rubbed by a shakedown brush other than said brushes in advance of assembling the brushes in the rotary electric machine, and a carbon coat is produced on the surface of the commutator by rubbing the surface with the shakedown brush.

2. The rotary electric machine according to claim 1, wherein a sliding width of said shakedown brush is larger than a primary sliding width of said brushes.

3. The rotary electric machine according to claim 1, wherein a material of the shakedown brush is different from that of the brushes.

4. The rotary electric machine according to claim 2, wherein a material of the shakedown brush is different from that of the brushes.

5. The rotary electric machine according to claim 1, wherein the rotary electric machine is applied to a motor for electromotive power steering device.

6. The rotary electric machine according to claim 2, wherein the rotary electric machine is applied to a motor for electromotive power steering device.

7. The rotary electric machine according to claim 3, wherein the rotary electric machine is applied to a motor for electromotive power steering device.

8. The rotary electric machine according to claim 4, wherein the rotary electric machine is applied to a motor for electromotive power steering device.

9. A method of manufacturing a rotary electric machine including a commutator, an armature having the commutator, and brushes sliding on a surface of the commutator comprising the steps of:

rubbing the surface of the commutator using a shakedown brush other than the brushes to produce a carbon coat on the surface of the commutator; and assembling the brushes in the rotary electric machine.

10. The method of manufacturing the rotary electric machine according to claim 9, wherein the step of rubbing in conducted when the armature stands as a single unit before assembling into the rotary electric machine.

11. The method of manufacturing the rotary electric machine according to claim 9, wherein the step of rubbing is conducted without applying electricity to the shakedown brush.

* * * * *